United States Patent
Wang et al.

(10) Patent No.: US 6,912,098 B2
(45) Date of Patent: Jun. 28, 2005

(54) METHOD FOR DYNAMICALLY MEASURING SUSPENSION IN-PLANE AND OUT-PLANE THERMAL DRIFT HARD DISK DRIVES

(75) Inventors: Geng Wang, San Jose, CA (US); Sang Y. Lee, Pleasanton, CA (US)

(73) Assignee: Samsung Electronics. Co., Ltd., Suwon (KR)

( * ) Notice: Subject to any disclaimer, the term of this patent is extended or adjusted under 35 U.S.C. 154(b) by 107 days.

(21) Appl. No.: 10/658,565

(22) Filed: Sep. 8, 2003

(65) Prior Publication Data

US 2005/0052766 A1 Mar. 10, 2005

(51) Int. Cl.$^7$ ............................................. G11B 5/02
(52) U.S. Cl. ................................... 360/31; 360/75
(58) Field of Search ............................ 360/31, 75, 77

(56) References Cited

U.S. PATENT DOCUMENTS

| | | | | |
|---|---|---|---|---|
| 5,535,069 A | * | 7/1996 | Chiao et al. ............. | 360/77.03 |
| 5,822,139 A | * | 10/1998 | Ayabe ........................ | 360/31 |
| 6,335,840 B1 | * | 1/2002 | Malone ...................... | 360/25 |
| 2003/0030934 A1 | * | 2/2003 | Schaff et al. ................. | 360/66 |

\* cited by examiner

*Primary Examiner*—W. R. Young
*Assistant Examiner*—Adam R. Giesy
(74) *Attorney, Agent, or Firm*—Jeffrey P. Aiello

(57) ABSTRACT

A method for dynamic in-situ characterization of in-plane and out-plane thermal drift of a hard disk drive head suspension is provided. A first data track is written. Amplitude and amplitude modulation of the write data signal are measured and track center is determined. Data tracks are then written for a selected time period. Amplitude and amplitude modulation of the write data signal is measured and a new track center of a last data track is determined. Any difference between the track center of the first data track and the track center of the last data track represents in-plane drift. The amplitude and amplitude modulation of the two write data signals is compared and any difference between the measured values is proportional to out-plane drift.

7 Claims, 3 Drawing Sheets

METHOD FOR DYNAMICALLY MEASURING SUSPENSION IN-PLANE AND OUT-PLANE THERMAL DRIFT HARD DISK DRIVES

BACKGROUND OF THE INVENTION

1. Field of the Invention

The present invention relates to hard disk drive suspensions and, more particularly, to a method for dynamically measuring suspension in-plane and out-plane thermal drift in hard disk drives.

2. Background Information

Hard disk drives contain a plurality of magnetic heads that are coupled to rotating disks. The heads write and read information by magnetizing and sensing the magnetic fields of the disk surfaces. Typically, the magnetic heads include a write element for magnetizing the disks and a separate read element for sensing the magnetic field of the disks. The read element is typically constructed using a magneto-resistive material that has a resistance that varies with the magnetic fields of the disk. Heads with magneto-resistive read elements are commonly referred to as magneto-resistive (MR) heads.

Each head, sometimes referred to as a head slider, is attached to a flexure arm to create a subassembly commonly referred to as a head gimbal assembly (HGA). The HGA's are attached to an actuator arm. The actuator arm has a voice coil motor that moves the heads across the surfaces of the disks.

Information is stored in radial tracks that extend across the surfaces of each disk. Each track is typically divided up into a number of segments or sectors. The voice coil motor and actuator arm can move the heads to different tracks of the disks and to different sectors of each track.

A suspension interconnect extends along the length of the flexure arm and connects the head to a preamplifier device of the voice coil motor. The suspension interconnect typically comprises conductive write traces and conductive read traces.

Data is written to the disk as the disk is rotating at a high frequency. Heat is generated as current flows along the write traces when writing data. This heat can cause the write traces to expand. Forces applied to the HGA by the expansion of the write traces can cause changes to the geometry of the flexure by causing bending or torsion of the HGA. This bending or torsion of the HGA is known as "Thermal Drift" in the art.

Thermal drift of the HGA may cause the HGA to shift in three dimensions. For example, the thermal drift of the HGA may cause the HGA to drift from a first data track towards an adjacent data track while writing data, resulting in track misalignment. This track misalignment may cause errors when the read/write heads do not properly align with tracks on the disk, adversely affecting the writing and/or reading of data. This can result in Position Error Signal (PES) errors.

Bending or torsion of the HGA may cause the head to move vertically relative to the surface of the disk, which may adversely affect reliability of the hard disk drive. For example, the vertical movement of the head toward the disk's surface may cause the head to contact the surface of the disk, which may cause damage to both the HGA and the disk, such as thermal asperity and medium surface scratching (TA/Scratch) or defects.

Vertical movement of the head away from the disk's surface may reduce the intensity of write data signals received on this disk's surface. This may adversely affect data being written to the disk and may result in data not being written to the disk.

Static thermal draft measurements have been performed in the prior art. However, results of these static thermal draft measurements are useful for reference only, due to the complexity of the dynamic head-disk interface (HDI) interaction.

Accordingly, there exists a need for a method for dynamic in-situ characterization of in-plane and out-plane suspension thermal drift in hard disk drives.

BRIEF SUMMARY OF THE INVENTION

The invention comprises a method for dynamic in-situ characterization of in-plane and out-plane thermal drift of a head suspension in a hard disk drive. The invention provides a real-time, or dynamic, means for measuring the thermal draft of hard disk drive head suspensions not found in the prior art. The method of the invention utilizes dynamic head-disk interface interaction to provide accurate head suspension thermal drift measurements.

The invented method is most easily performed on a hard disk drive spin stand. The method commences with a first data track being written for one revolution of a disk of a hard disk drive. During the revolution the amplitude of the write data signal is measured. Amplitude modulation of the write data is also measured, and track center is determined.

Data tracks are then written for a predetermined time period. A new track center of a last data track is determined. Write data signal amplitude and amplitude modulation for the last data track are also measured.

The track center of the last data track is compared to the track center of the first data track. The difference between the two track centers represents in-plane drift of the HGA. The amplitude and amplitude modulation of the write data signal measured when the first data track was written is compared to the amplitude and amplitude modulation of the write data signal measured when the last data track was written. The difference between the measured values of amplitude and amplitude modulation of the write data signals is proportional to the out-plane drift of the HGA.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

The invention includes a method for dynamic in-situ characterization of in-plane and out-plane thermal drift of a head suspension in a hard disk drive. The invention provides a real-time, or dynamic, means for measuring the thermal draft of hard disk drive head suspensions not found in the prior art. The method of the invention utilizes dynamic head-disk interface interaction to provide accurate head suspension thermal draft measurements.

Figure 1:
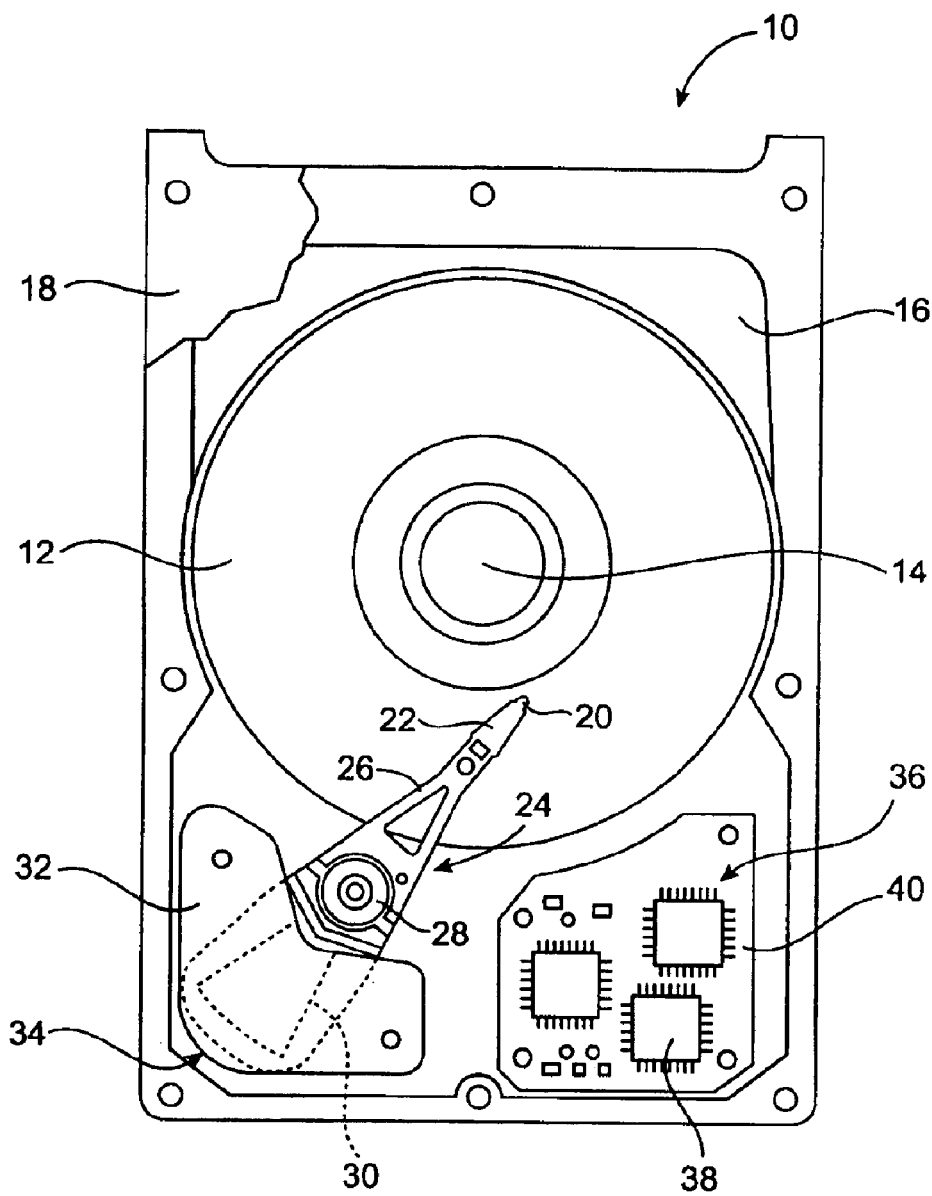
FIG. 1 is a top view of an embodiment of a hard disk drive of the invention.

Referring to the drawings, more particularly by reference numbers, FIG. 1 shows an embodiment of a hard disk drive 10 of the present invention. The hard disk drive 10 may include one or more magnetic disks 12 that are rotated by a spindle motor 14. The spindle motor 14 may be mounted to a base plate 16 of the drive 10. The disk drive 10 may further include a cover 18 that encloses the disks 12.

The disk drive 10 may include a plurality of head sliders, or heads, 20 located adjacent to the disks 12. The heads 20 may have separate write and read elements (both not shown) that magnetize and sense the magnetic field of the disks 12.

Each head may be gimbal mounted to a flexure arm 22 as part of a head gimbal assembly (HGA), shown generally at 24. The flexure arms 22 are attached to an actuator arm 26 that is pivotally mounted to the base plate 16 by a bearing assembly 28. A voice coil 30 is coupled to a magnet assembly 32 to create a voice coil motor (VCM) 34. Providing a current to the voice coil 30 creates a torque that swings the actuator arm 26 and moves the heads 20 across the surfaces of the disks 12.

The disk drive 10 may further include a printed circuit board assembly 36. The printed circuit board assembly 36 may include a plurality of integrated circuits 38 coupled to a printed circuit board 40. The printed circuit board 40 is coupled to the voice coil 30, heads 20, and spindle motor 14 by wires (not shown).

Referring to the drawing Figures, the invented method is most easily performed on a hard disk drive spin stand (not shown). The method commences with a first data track being written for one revolution of a disk 12 of a hard disk drive 10. During the revolution the amplitude of the write data signal is measured. Amplitude modulation of the write data is also measured, and track center is determined.

Figure 3:
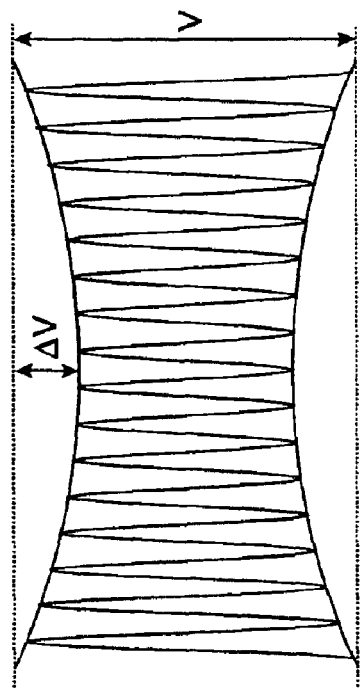
FIG. 3 is a diagrammatic representation showing amplitude modulation of a data write signal.
Figure 2:
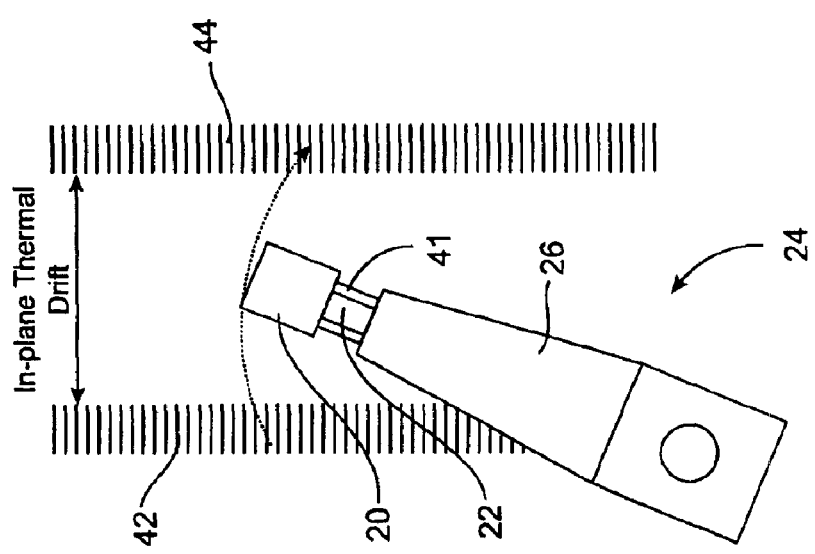
FIG. 2 is an enlarged top plan view showing in-plane drift of a head gimbal assembly.

Referring to FIG. 2 and FIG. 3, heat is generated as current flows along write traces 41 of the flexure arm 22 when data is written to the disk 12. This heat may cause the write traces 41 to expand. Forces applied to the HGA 24 by the expansion of the write traces 41 can cause changes to the geometry of the flexure 22 by causing bending or torsion of the HGA 24. This bending or torsion of the HGA 24 is known as "Thermal Drift" in the art.

Thermal drift of the HGA 24 may cause shifting of the HGA in three dimensions. As shown in FIG. 2, the thermal drift of the HGA 24 may cause the HGA to drift from a first data track 42 towards an adjacent data track 44, resulting in track misalignment. This track misalignment may cause errors when the head 20 does not properly align with tracks 42, 44 on the disk 12, adversely affecting the writing and/or reading of data. This can result in Position Error Signal (PES) errors.

As shown in FIG. 3, bending or torsion of the HGA 24 may cause the head 20 to move vertically relative to the surface of the disk 12, resulting in increased amplitude modulation ΔV. Increased amplitude modulation ΔV indicates that the head is not flying at a stable flying height over the disk's surface. This unstable flying height may adversely affect reliability of the hard disk drive 10. For example, the vertical movement of the head 20 toward the disk's surface may cause the head 20 to contact the surface of the disk 10, which may cause damage to both the head 20 and the disk 12, such as thermal asperity and medium surface scratching (TA/Scratch) or defects.

Vertical movement of the head 20 away from the disk's surface may reduce the intensity of write data signals received on this disk's surface. This may adversely affect data being written to the disk 12 and may result in data not being written to the disk 12.

Figure 4:
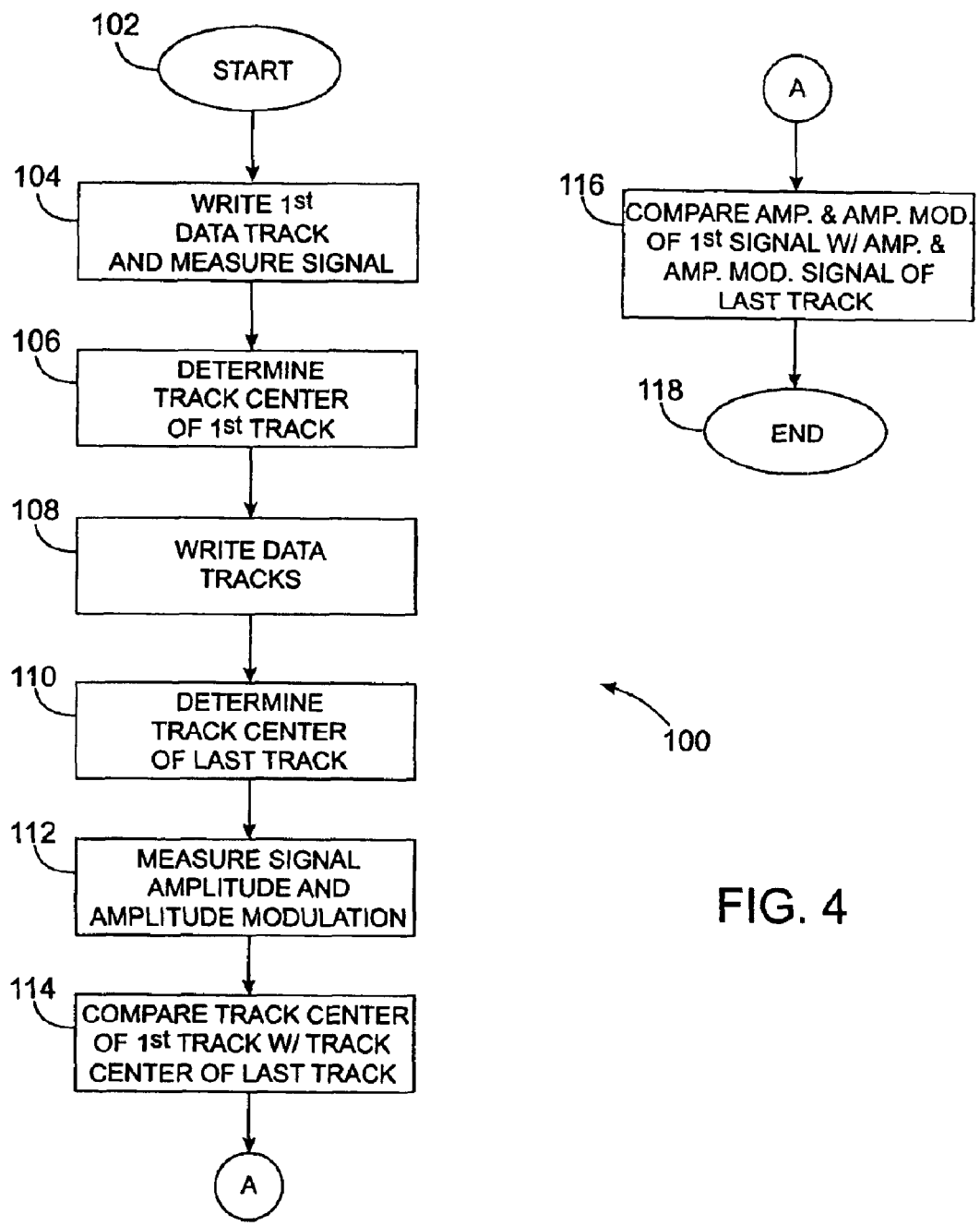
FIG. 4 is a flow chart showing the invented method for dynamic in-situ characterization of in-plane and out-plane thermal drift of a head suspension in a hard disk drive.

Discussion of the invented method for dynamic in-situ characterization of in-plane and out-plane thermal drift of a head suspension in a hard disk drive balanced disk packs hereafter will incorporate the use of a flowchart, shown in FIG. 4. Use of the flowchart of FIG. 4 merely simplifies the discussion, and is not meant to limit the scope of the claims. The flowchart of the invented method possesses arrows with reference numbers. These arrows signify flow of control and, sometimes, data flow. The arrows may support implementations including at least one program step, or program thread, that may be executed by a computer.

The operation of starting a flowchart may refer to at least one of the following: entering a subroutine in a macro instruction sequence in a computer; entering into a deeper node of an inferential graph; and triggering a collection of neurons in a neural network. The operation of termination in a flowchart refers to the completion of operations. It may result in a subroutine return, traversal to a higher node in an inferential graph, popping of a previously stored state in a finite state machine, and/or return to dormancy of firing neurons in a neural network.

Referring now to FIG. 4 of the drawings, the method of the invention is shown generally at 100. The invented method commences in start block 102. In process block 104 a first data track is written for one revolution of the disk 12 of the hard disk drive 10. While the first data track is written, the amplitude of the write data signal is measured and amplitude modulation of the signal is also measured. In process block 106 track center of the first track is determined.

In process block 108 data tracks are written for a predetermined time period. A new track center of a last data track is determined in process block 110. In process block 112, the write data signal amplitude and amplitude modulation for the last data track are measured.

In process block 114, the track center of the last data track is compared to the track center of the first data track. Any measured difference between the two track centers represents in-plane drift of the HGA 24.

In process block 116, the amplitude and amplitude modulation of the write data signal measured when the first data track was written is compared to the amplitude and amplitude modulation of the write data signal measured when the last data track was written. Any measured difference between the measured values of amplitude and amplitude modulation of the write data signals is proportional to the out-plane drift of the HGA 24.

Thus, the invention provides a method and apparatus for dynamic in-situ characterization of in-plane and out-plane thermal drift of a head suspension in a hard disk drive. The invention provides a real-time, or dynamic, means for measuring the thermal draft of hard disk drive head suspensions not found in the prior art. The method of the invention utilizes the dynamic head-disk interface interaction to provide accurate head suspension thermal draft measurements.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for dynamically measuring thermal drift of a head suspension in a hard disk drive, the method comprising the following steps:

writing a first data track;

determining a track center of the first data track;

writing a second data track;

determining a track center of the second data track; and comparing the track center of the first data track to the track center of the second data track, a difference between the track center of the first data track and the track center of the second data track representing thermal drift of the head suspension.

2. The method of claim 1 wherein the difference between the track center of the first data track and the track center of the second data track represents in-plane thermal drift of the head suspension.

3. The method of claim 1 wherein the method is performed on a spin stand.

4. A method for dynamically measuring thermal drift of a head suspension in a hard disk drive, the method comprising the following steps:

writing a first data track;

measuring amplitude of a write data signal as the first data track is written;

writing a second data track;

measuring amplitude of a write data signal as the second data track is written; and comparing the amplitude of the write data signal measured as the first data track is written to the amplitude of the write data signal measured as the second data track is written, a difference between the measured values of amplitude of the write data signals representing thermal drift of the head suspension.

5. The method of claim 4 wherein the difference between the measured values of the amplitude of the write data signals represents out-plane thermal drift of the head suspension.

6. A method for dynamically measuring thermal drift of a head suspension in a hard disk drive, the method comprising the following steps:

writing a first data track;

determining a track center of the first data track;

measuring amplitude and amplitude modulation of the write data signal as the first data track is written;

writing data tracks for a selected time period;

determining a track center of a last data track written during the selected time period;

measuring amplitude and amplitude modulation of the write data signal as the last data track is written;

comparing the track center of the first data track to the track center of the last data track, a difference between the track center of the first data track and the track center of the last data track representing in-plane thermal drift of the head suspension; and comparing the amplitude and amplitude modulation of the write data signal measured as the first data track is written to the amplitude and amplitude modulation of the write data signal measured as the last data track is written, a difference between the measured values of the amplitude and amplitude modulation of the write data signals representing thermal drift of the head suspension.

7. The method of claim 6 wherein the difference between the measured values of the amplitude and amplitude modulation of the write data signals is proportional to the out-plane thermal drift of the head suspension.

* * * * *